Aug. 9, 1927.

H. E. BRUNNER 1,638,521

ANTIFRICTION BEARING LUBRICATION

Filed Sept. 15, 1925

INVENTOR
Harold E. Brunner
BY
HIS ATTORNEY

Patented Aug. 9, 1927.

1,638,521

UNITED STATES PATENT OFFICE.

HAROLD E. BRUNNER, OF MAMARONECK, NEW YORK, ASSIGNOR TO THE HESS-BRIGHT MANUFACTURING COMPANY, OF PHILADELPHIA, PENNSYLVANIA, A CORPORATION OF PENNSYLVANIA.

ANTIFRICTION-BEARING LUBRICATION.

Application filed September 15, 1925. Serial No. 56,462.

This invention relates to a lubricating device for anti-friction bearings and has for an object to provide means for furnishing an even and predetermined supply of liquid lubricant by gravity and preferably filtered and controlled by a wick feed from a reservoir. When the device is used in connection with a pair of ball or roller bearings the fed lubricant is accumulated in a space between the lower portions of the outer rings of the bearing; the housing being so designed that the used lubricant after passing from such accumulating space through the bearings is received and held for discharge at convenience.

Figure 1:
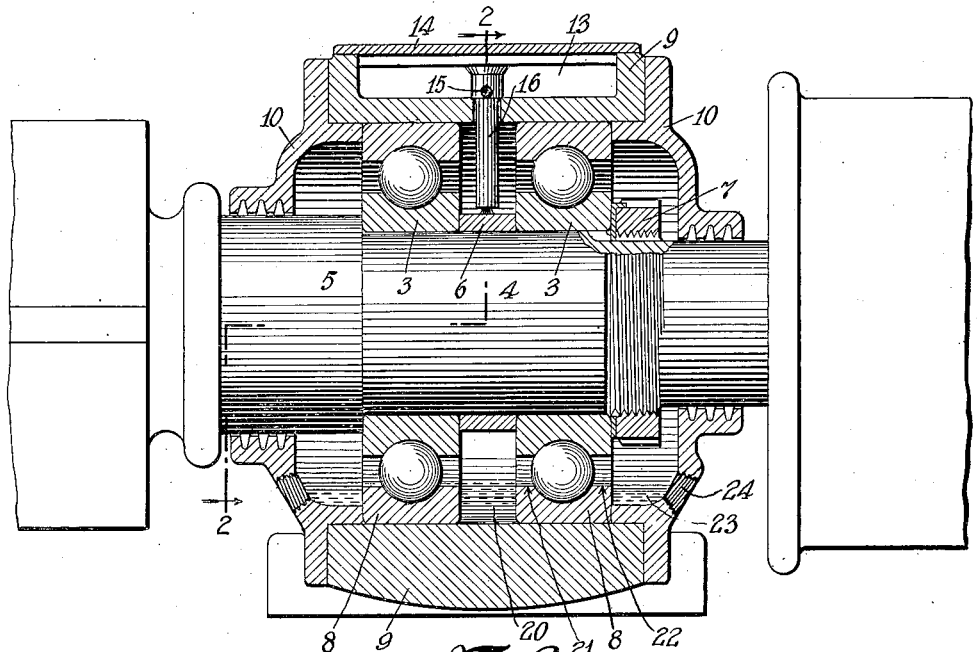
Figure 2:
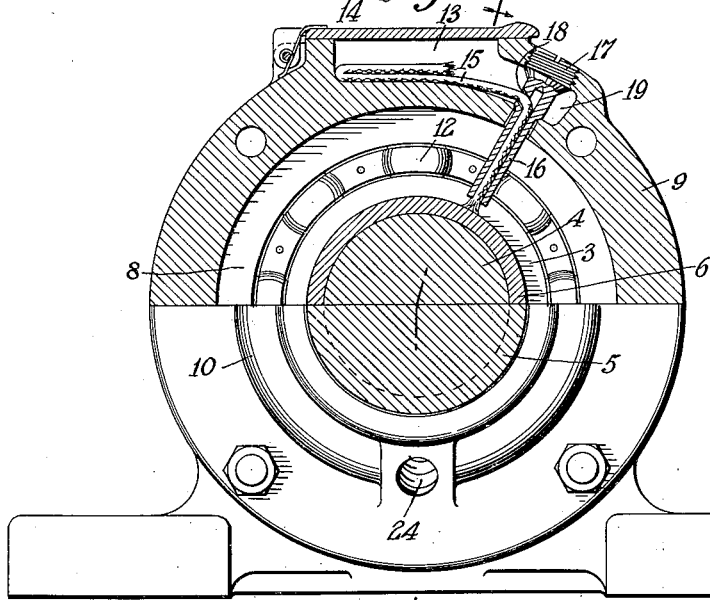

In the drawings accompanying this application one practicable embodiment of my invention is illustrated, in which drawings Figure 1 is a view generally in central longitudinal section, the upper portion however being taken at a little one side of the center line indicated by the line 1—1 in Fig. 2, and Fig. 2 is a view partly in elevation and partly in cross section taken at about the line 2—2 of Figure 1.

The purpose of the application of my device to the mechanism illustrated in the drawings is to afford a continuous and predetermined supply of lubricant to a pair of ball bearings comprising inner rings 3—3 mounted on a shaft 4. One of these rings is shown pressed against a shoulder afforded by the face of the enlarged portion, 5, of the shaft. A spacing ring, 6, is disposed between the two rings 3—3. The bearing rings and sleeve are tightened and held in position by means of a suitable nut, 7. The outer rings, 8, of the bearings are shown mounted in a housing, 9, in which they are held in proper position by means of a pair of cover plates, 10. While the particular type of bearing forms no part of the invention it might be stated that the bearings illustrated are of the single row deep groove type, each furnished with a single row or set of balls, 11. These in Fig. 2 are shown furnished with a cage or retainer, 12. For simplicity of drawing the cages are not shown in Figure 1.

At the upper portion of the housing, 9, there is shown formed a lubricant reservoir, 13, closed by a lid, 14. Preferably the draining or discharge portion of the reservoir, 13, drops downwardly so as to assure the more complete evacuation by gravity of the oil or other liquid. The discharge from the reservoir is by gravity—through a tube, 16, having a port, 18, in its side communicating with the reservoir at a point below the normal liquid level. The lower end of the tube is open and extends to the place at which this lubricant is to be discharged. The flow of the lubricant through the tube, 16, is controlled by means of a filtering device shown in the form of a wick, 15, having one or more convolutions located in the reservoir, 13, and a portion extending downwardly and feeding the lubricant to a rotary part located between the two inner rings 3—3 of the bearing. In the present instance the lower end of the wick rubs against the outer perimeter of the spacing ring, 6. In describing the mechanism it was not stated, although it is obvious from the drawings, that the housing and the outer rings, 8, of the bearings remain stationary while the shaft, 4, with the inner rings, 3, rotates. The applicator portion of the wick is shown as being steadied and protected by means of the tube, 16. For convenience of assembly and removal the upper end of the tube is shown enlarged and screw threaded, as at, 17, and entering a properly screw threaded socket formed in the casing. The tube is shown closed on its down side where passing through the reservoir, 13, and open at, 18, at its upper side. A small accumulation space, 19, is afforded in the reservoir below the closed side of the tube.

By means of a properly selected material, the lubricant from the reservoir, 13, is fed downwardly therefrom and applied to the surface of the rotating member, 6, thoroughly filtered and in a continuous and even flow, that is, the flow will be even when the machine is idle so that there will be sure to be lubricant present at the instant of starting and also an even flow but at a more accelerated speed at the various speeds at which the shaft, 4, rotates.

Some of the lubricant gains access to the race-way paths and the balls, 11, by running outwardly upon the side faces of the rings 3—3; the greater portion, however, is thrown from the surface of the ring, 6, by centrifugal force, strikes the inner wall of the housing, 9, and flows down into the space, 20, formed on the lower portion of the housing between the rings, 8—8. Upon a sufficient amount of lubricant accumulating in this space, 20, it flows outwardly over the lands, 21, of the rings, 8, and into a position to be taken up by the balls in their rotation. Used lubricant and lubricant in access of the demands of the bearing will flow outwardly over the lands, 22, into the space, 23, at the outer sides of the rings, 8, and there accumulate in a small quantity and flow away through the openings, 24.

It is to be understood that various changes in details of construction may be made in applying and using my invention, these changes coming within the terms of the claims without departing from the spirit of the invention.

Having thus described my invention I claim and desire to secure by Letters Patent:

1. The combination with a housing a rotary shaft mounted therein by a pair of spaced apart anti-friction bearings, of means to supply lubricant between the anti-friction bearings, the bearings being so mounted in the housing that there is a lubricant space afforded at the lower portion between the bearings, and there being a space afforded at the lower portion outwardly of each of the bearings for receiving used and surplus lubricant.

2. The combination with a housing, a rotary shaft mounted therein by a pair of spaced anti-friction bearings, and a lubricant reservoir disposed above the shaft, of a wick extending downwardly from the reservoir to a position to apply lubricant to the shaft between the anti-friction bearings mounted thereon, the bearings being so mounted in the housings that there is afforded at the lower portion outwardly of each of the bearings a space for receiving used and surplus lubricant, and means for withdrawing lubricant from the said outwardly disposed spaces.

3. The combination with a housing, a rotary shaft mounted therein by a pair of spaced apart anti-friction bearings, and a lubricant reservoir disposed above the shaft, of a gravity feed comprising a tube extending downwardly from the reservoir to a position adjacent the shaft, and a wick extending downwardly through the tube to the shaft between the anti-friction bearings mounted thereon, the bearings being so mounted in the housing that there is a lubricant space afforded at the lower portion between the bearings, and there being a space afforded at the lower portion outwardly of each of the bearings for receiving used and surplus lubricant.

4. The combination with a housing, a rotary shaft mounted therein by a pair of spaced apart anti-friction bearings, and a lubricant reservoir disposed above the shaft, of a gravity feed comprising a wick extending downwardly from the reservoir to a position to apply lubricant to the shaft between the anti-friction bearings mounted thereon, the bearings being so mounted in the housing that there is afforded at the lower portion outwardly of each of the bearings a space for receiving used and surplus lubricant, and means for withdrawing lubricant from the said outwardly disposed spaces.

5. The combination with a housing, a rotary shaft mounted therein by a pair of spaced apart anti-friction bearings, means to supply lubricant between the anti-friction bearings, the bearings being so mounted in the housing that there is a lubricant space afforded at the lower portion between the bearings and a lubricant space afforded at the lower portion outwardly of each of the bearings, of means for withdrawing surplus lubricant from said outwardly disposed spaces.

Signed at the city of New York, N. Y., this 11th day of September, 1925.

HAROLD E. BRUNNER.